United States Patent
Kusbel et al.

(10) Patent No.: US 6,999,723 B2
(45) Date of Patent: Feb. 14, 2006

(54) SYSTEM AND METHOD FOR REDUCING THE EFFECTS OF CLOCK HARMONIC FREQUENCIES

(75) Inventors: Patrick Kusbel, Longmont, CO (US); Cheng Tan, Boulder, CO (US); Troy Curtiss, Erie, CO (US)

(73) Assignee: Kyocera Wireless Corp., San Diego, CA (US)

( * ) Notice: Subject to any disclaimer, the term of this patent is extended or adjusted under 35 U.S.C. 154(b) by 361 days.

(21) Appl. No.: 09/998,458

(22) Filed: Nov. 29, 2001

(65) Prior Publication Data

US 2003/0100280 A1 May 29, 2003

(51) Int. Cl.
*H04B 1/10* (2006.01)
*H04B 15/00* (2006.01)

(52) U.S. Cl. ..................... 455/63.1; 455/63.1; 455/296; 455/310; 375/346

(58) Field of Classification Search ................ 455/63.1, 455/222, 283, 296, 310, 168.1, 164.2, 180.1, 455/182.2, 180.3, 183.2, 188.1, 190.1, 191.3, 455/259, 260; 375/346
See application file for complete search history.

(56) References Cited

U.S. PATENT DOCUMENTS

| | | | | |
|---|---|---|---|---|
| 4,879,758 A | * | 11/1989 | DeLuca et al. ............. | 455/296 |
| 5,263,055 A | * | 11/1993 | Cahill ......................... | 375/346 |
| 5,745,848 A | * | 4/1998 | Robin ......................... | 455/296 |
| 5,794,131 A | * | 8/1998 | Cairns ......................... | 455/76 |
| 5,926,514 A | * | 7/1999 | Meador et al. ............. | 375/346 |
| 6,345,172 B1 | * | 2/2002 | Hirai et al. .................. | 455/76 |
| 6,567,654 B1 | * | 5/2003 | Coronel Arredondo et al. . | 455/315 |

* cited by examiner

*Primary Examiner*—Simon D Nguyen

(57) ABSTRACT

A system and a method are provided for reducing the effects of spurious frequencies in a wireless communications device. The system comprises a processor having a reference frequency input and a clock having an output connected to the processor input. The clock supplies a clock frequency, or reference frequency, to the processor. The reference frequency is the frequency at which the processor operates. The clock also has an input for selecting a reference frequency to provide to the processor. The system also includes a transceiver having a plurality of selectable communications passbands. If the wireless communications device is a telephone, for example, the transceiver frequency (passband) may change as a function of the mode in which the phone is operating (AMPS, PCS, GSM, CDMA, or W-CDMA). In response to changing operating modes (transceiver passband), the clock frequency is adjusted. The clock frequency is selected so that harmonic frequencies associated with the clock frequency do not substantially interfere with the transceiver passband.

20 Claims, 2 Drawing Sheets

SYSTEM AND METHOD FOR REDUCING THE EFFECTS OF CLOCK HARMONIC FREQUENCIES

BACKGROUND OF THE INVENTION

1. Field of the Invention

This invention generally relates to wireless communications and, more particularly, to a system and method for reducing the effects of clock generated harmonics in the transceiver passband of a wireless communications device.

2. Description of the Related Art

Processors, such as microprocessors, are an integral part of many electronic products, including a typical wireless communications device. Microprocessors are typically used to execute instruction sets and to generally control the operation of devices. A clock is used with the typical microprocessor to provide a frequency at which the microprocessor operates. A crystal is a conventional and inexpensive way of supplying a microprocessor reference frequency. As is well known, spurious frequencies such as harmonics, are generated by the clock, along with the desired clock frequency. These spurious frequencies, as well as the crystal resonant frequency, "leak" through to other circuits on the device printed circuit board through conductance on the power lines or grounds, and through radiation. These spurious frequencies can interfere with the operation of a device by manifesting themselves as noise to other portions of the wireless communications device.

A wireless communication device transceiver circuit is especially susceptible to interference from spurious signals. In some instances, the spurious signals have frequencies equal to the carrier frequency of the wireless communications device. By equal to the carrier frequency, it is to be understood that this includes spurious signals that have some power in the passband of the wireless communication device. These spurious signals may provide undesirable noise and degrade performance of the device. For example, noise in the passband of a receiver can degrade sensitivity, while noise in a transmitter passband can violate system specifications, or raise the general noise floor of the system in which the wireless device is operating.

To solve spurious signal and interference problems, it is typically necessary to add filtering circuits or shielding to the circuit board. However, this solution takes time and adds to the total parts count. In some instances, the size and position of the board may limit the filtering that can be provided. It is known to change the clock frequency to avoid harmonic interference with the local oscillator or other transceiver circuitry. However, it is not desirable to reselect wireless device crystals to accommodate printed circuit board filtering issues. In wireless devices that operate with more than one transceiver frequency, it may be difficult to find a single clock frequency that supports the operation of the digital circuitry, and yet avoids interfering with at least one of the transceiver frequencies.

It would be advantageous if the undesirable effects of spurious frequencies, such as those harmonically related to a clock, could be eliminated from or substantially reduced in the passband of a transceiver without special filtering.

It would be advantageous if a wireless communications device could be operated at a plurality of transceiver frequencies while reducing the noise effects of spurious signals related to clock generated harmonics.

SUMMARY OF THE INVENTION

The present invention was created to address the problem of reducing the effects of clock-generated harmonics in the transceiver passband of a wireless communications device. The invention recognizes that the harmonics generated by a clock can leak through to the transceiver and cause sensitivity, noise, and system specifications problems in the wireless device. The invention also recognizes that the avoidance of harmonics by the use of filtering circuits or shielding, or by changing crystals is not always desirable or effective. The invention addresses the above-mentioned problem by selectively adjusting clock frequencies so that the harmonics associated with the selected clock frequency do not substantially interfere with the operating passband of the transceiver.

Accordingly, a system is provided for reducing the effects of spurious frequencies that substantially interfere with the performance of a wireless communications device. The system comprises a processor having a clock frequency input and a clock having an output connected to the processor input to supply the clock frequency. The clock frequency is the frequency at which the processor operates. The clock has an input for selecting a clock frequency to provide to the processor.

The system also includes a transceiver supplying a plurality of selectable communications passbands. If the wireless communications device is a telephone for example, the transceiver frequency (passband) changes as a function of the mode in which the phone is operating (advanced mobile phone service (AMPS), personal communication services (PCS), global system for mobile communications (GSM), code division multiple access (CDMA), or wideband CDMA (W-CDMA)). In response to changing operating modes, the clock adjusts the clock frequency. The clock frequency is selected so that harmonic frequencies associated with the clock frequency do not substantially interfere with the transceiver passband.

Additional details of the above-described system and a method for reducing the effects of spurious frequencies in a wireless device are presented below.

DETAILED DESCRIPTION OF THE PREFERRED EMBODIMENTS

Figure 1:
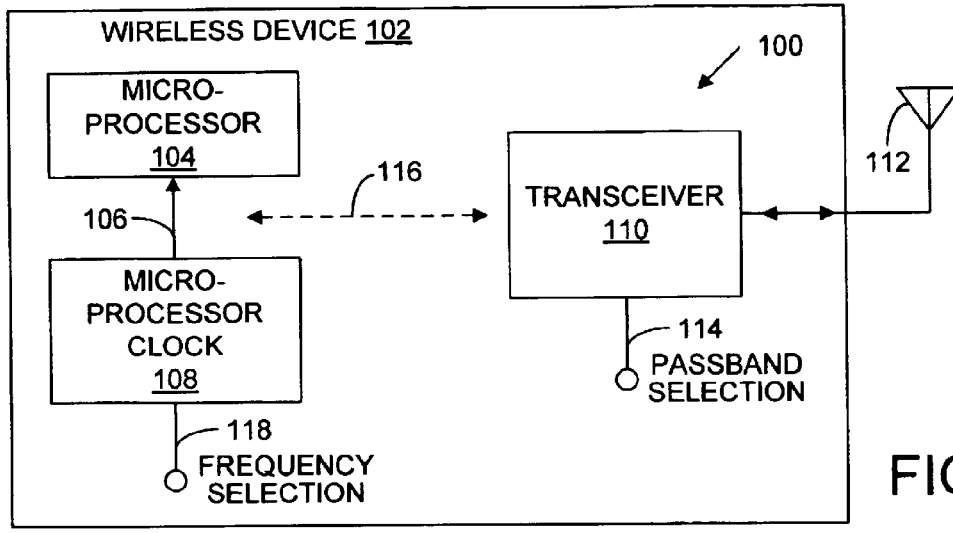
FIG. 1 is a schematic block diagram depicting the system for reducing the effects of spurious frequencies in a wireless communications device in accordance with the present invention.

FIG. 1 is a schematic block diagram depicting the system 100 for reducing the effects of spurious frequencies in a wireless communications device 102 in accordance with the present invention. The device 102 includes a microprocessor 104 with an input on line 106 to accept a clock frequency. A clock 108 has an output on line 106 to supply a clock frequency to the microprocessor 104. This clock frequency is often the fundamental frequency of a crystal source. The clock 108 is capable of providing a plurality of predetermined clock frequencies, as described below.

It will be appreciated that other types of processors and designs may be substituted for the microprocessor and clock. For example, a processor and a clock may be provided on an application specific integrated circuit as a single component. Also, other types of processors, such as gate arrays or other programmable logic devices may be used.

A transceiver 110 has a port to transmit and receive a carrier frequency via an airlink interface. The airlink interface is represented by antenna 112. The transceiver 110 may include de/modulating circuits, power amplifiers, receivers, frequency sources, and other components (not shown), but well known in the art. The transceiver is typically a multi-band transceiver having an input on line 114 for accepting commands selecting one of a plurality of communication passbands. Alternately but not shown, the device 102 includes a plurality of transceivers, each tuned to operate in a different passband.

Harmonics are generated by the clock 108, along with the desired clock frequency needed to operate the microprocessor 104. Harmonics are signals that are at harmonic frequencies. Harmonic frequencies are multiples of another frequency or frequencies called the fundamental frequency or frequencies. Generally, harmonic frequencies may be any ratio of integers multiplied by the fundamental frequency or some combination of the fundamental frequencies. Harmonics are typically numbered in increasing order of the ratio. In one common scheme for naming harmonics, the denominator in the ratio is one. The first harmonic frequency is equal to the fundamental frequency. The second harmonic frequency is equal to two times the fundamental frequency, and, for example, the $46^{th}$ harmonic frequency is equal to 46 times the fundamental frequency. This common scheme for naming harmonics is used in this patent. It is to be understood, however, that the methods and devices described herein can be similarly used with harmonic frequencies that are non-integer multiples of the fundamental frequency.

These harmonics can appear as spurious frequencies that can radiate or conduct into the transceiver 110, interfering with the carrier frequencies. The radiation or conduction of these spurious frequencies are represented by the dashed line with the reference designator 116. Although the harmonics can be filtered or shielded from the transceiver 110, this problem is often more directly solved by selecting a crystal frequency with harmonics that avoid the transceiver passband. However, selecting a crystal frequency that generates harmonics outside the transceiver passband can become difficult, or even impossible, if the device 102 has multiple transceivers or if the transceiver 110 is expected to operate at more than one carrier frequency (as shown).

To this end, the microprocessor 104 operates at more than one clock frequency. The clock 108 has an input on line 118 to accept selections for clock frequencies, and supplies clock frequencies in response to the selections on line 118. In some aspects of the system 100, different clock frequency can be selected by selecting between one or more different crystals oscillating at different frequencies. In other aspects of the system 100, different clock frequencies can be selected by tuning a phase lock loop to a different frequency.

The following example illustrates the operation of the present system 100. When the wireless device 102 is operating in a first mode, such as code division multiple access (CDMA), the clock 108 provides a first reference frequency to the microprocessor 104. In turn, the transceiver 110 operates in the CDMA passband of approximately 1900 megahertz (MHz). The CDMA passband is selected in response to commands on line 114. When the wireless device 102 switches to a second mode, such as the AMPS (analog) mode, in response to commands on line 114, the transceiver 110 switches passband frequencies. The AMPS center frequency is approximately 900 MHz.

If the first clock frequency generated by clock 108 has an associated harmonic that occurs at 900 MHz, the transceiver signals may be degraded when the transceiver 110 switches to the AMPS mode. To avoid such interference, a second clock frequency is selected using the clock 108 input on line 118. In response, the clock 108 provides the second clock frequency to the microprocessor 104 on line 106. The second clock frequency is predetermined so that the harmonics associated with it do not interfere with the second mode (AMPS) passband.

More specifically, if the first clock frequency is 19.2 MHz, the $46^{th}$ harmonic is 883.2 MHz. This is a frequency that does not interfere with the CDMA passband centered around 1900 MHz. However, the $46^{th}$ harmonic does interfere with the transceiver 110 when switched into the AMPS mode at approximately 900 MHz. To solve the interference problem, the second clock frequency is selected to be 26.24 MHz. The $46^{th}$ harmonic at 1207 MHz is far removed from the AMPS passband.

Figure 2:
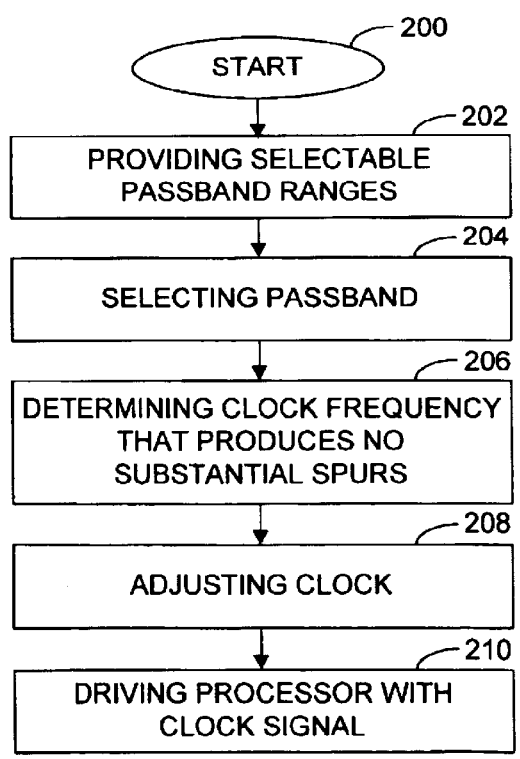
FIG. 2 is a flowchart illustrating the method for reducing the effects of spurious frequencies in a wireless communications device in accordance with the present invention.

FIG. 2 is a flowchart illustrating the method for reducing the effects of spurious frequencies in a wireless communications device in accordance with the present invention. Although the method (and the other methods described below) is depicted as a sequence of numbered steps for clarity, no order should be inferred from the numbering unless explicitly stated. It should be understood that some of these steps may be skipped, performed in parallel, or performed without the requirement of maintaining a strict order of sequence. The method starts at Step 200. Step 202 provides a plurality of selectable passband ranges for the wireless communications device. Step 204 selects one of the passband frequency ranges. Step 206 determines a clock frequency that produces no substantial spurious signals (spurs) in the selected passband frequency range. Step 208 adjusts a clock to generate a clock signal at the clock frequency. Step 210 drives a processor with the clock signal. In one aspect of the invention, selecting one of the passband frequency ranges in Step 204 includes providing a cellular passband frequency range and a PCS passband frequency range.

Figure 3:
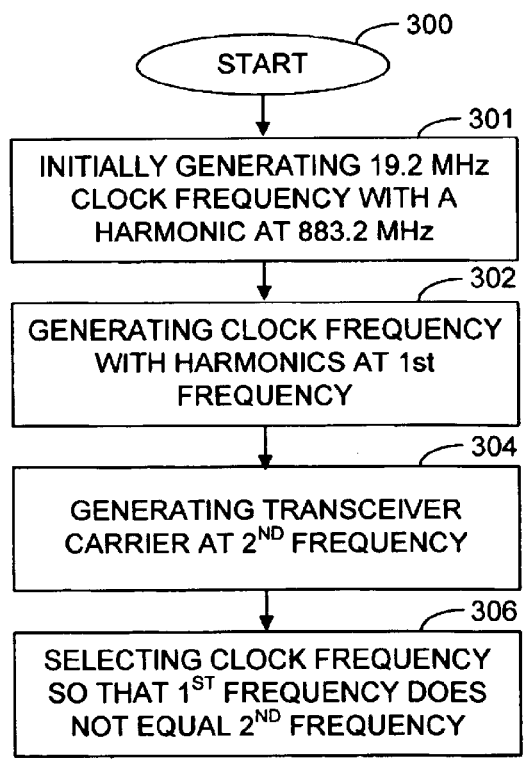
FIG. 3 is a flowchart illustrating the method for avoiding spurious frequencies in the transceiver passband of a wireless communications device in accordance with the present invention.

FIG. 3 is a flowchart illustrating the method for avoiding spurious frequencies in the transceiver passband of a wireless communications device in accordance with the present invention. The method starts at Step 300. Step 302 generates a clock frequency with harmonics at a first frequency. Step 304 generates a transceiver carrier at a second frequency. Step 306 selects the clock frequency so that the first frequency does not equal the second frequency.

In some aspects of the method, generating a transceiver carrier at a second frequency in Step 304 includes generating a transceiver carrier with a center frequency of approximately 900 MHz. A further step, Step 301, initially generates a clock frequency at 19.2 megahertz (MHz) with a $46^{th}$ harmonic at 883.2 MHz. Then, selecting the clock frequency so that the first frequency does not equal the second frequency in Step 306 includes increasing the clock frequency from 19.2 MHz to 26.24 MHz.

Figure 4:
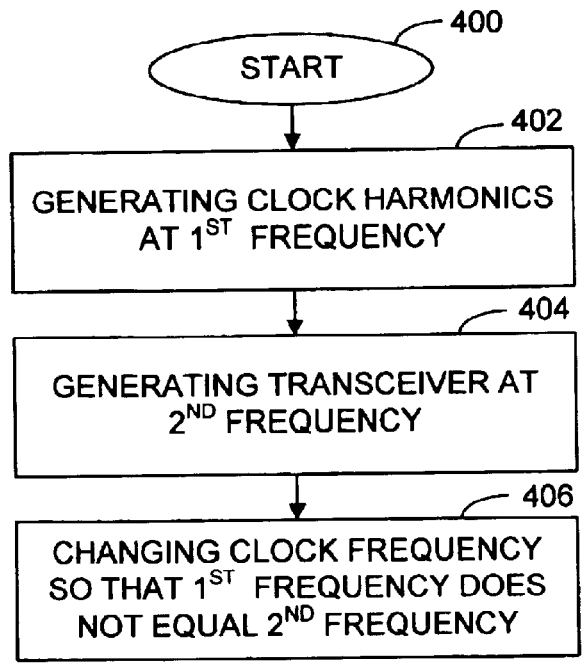
FIG. 4 is a flowchart illustrating the method for reducing the effects of clock harmonics in the passband of a wireless communications device in accordance with the present invention.

FIG. 4 is a flowchart illustrating the method for reducing the effects of clock harmonics in the passband of a wireless communications device in accordance with the present invention. The method starts at Step 400. Step 402 generates a clock frequency with harmonics at a first frequency. Step 404 generates a transceiver carrier at a second frequency. Step 406 changes the clock frequency so that the first frequency does not equal the second frequency.

Figure 5:
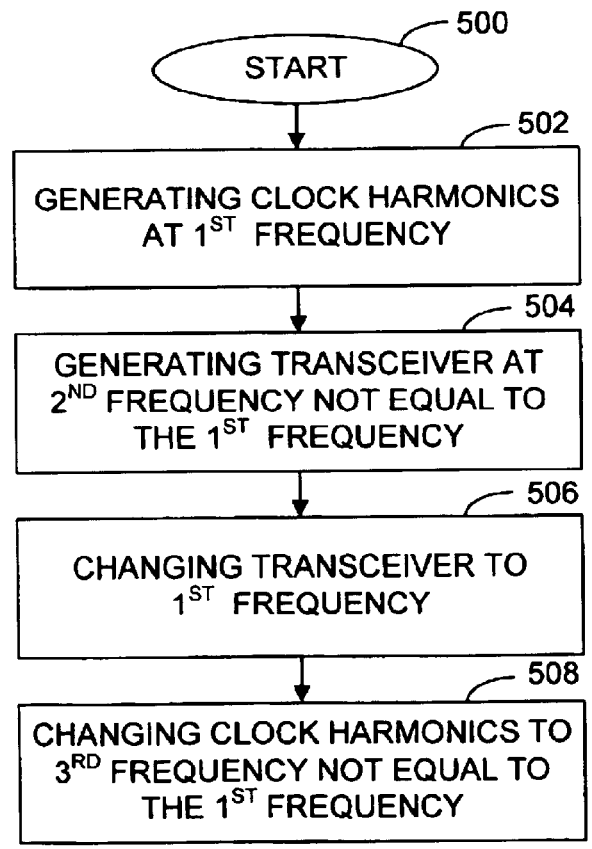
FIG. 5 is a flowchart illustrating another aspect of the method for reducing the effects of clock harmonics in the passband of a wireless communications device in accordance with the present invention.

FIG. 5 is a flowchart illustrating another aspect of the method for reducing the effects of clock harmonics in the passband of a wireless communications device in accordance with the present invention. The method starts at Step 500. Step 502 generates a clock frequency with harmonics at a first frequency. Step 504 generates a transceiver carrier at a second frequency not equal to the first frequency. Step 506 changes the transceiver carrier to the first frequency. Step 508 changes the clock frequency to a clock frequency with harmonics at a third frequency, not equal to the first frequency.

A system and a method are provided for reducing the effects of spurious frequencies in the transceiver passband of a wireless communications device. Examples of the invention have featured specific reference frequencies, passband frequencies, and modes of operation, however, it should be understood that the present invention is not limited to any particular frequencies or modes of operation. Examples have also been given of a wireless telephone device, however, it should be understood that the invention is applicable to a broader field of wireless operations. Other variations and embodiments of the invention will occur to those skilled in the art.

We claim:

1. A method for reducing effects of spurious frequencies in a wireless communications device, the method comprising:
    operating a transceiver in a first mode of operation comprising one of an analog mode and a digital mode;
    selecting a first passband frequency range of a plurality of selectable passband frequency ranges, the first passband frequency range corresponding to the first mode of operation;
    operating a processor in the first mode of operation at a first processor clock frequency of a plurality of processor clock frequencies;
    switching operation of the transceiver to a second mode of operation comprising the analog mode and the digital mode;
    selecting a second passband frequency range of the plurality of selectable passband frequency ranges, the second passband frequency range corresponding to the second mode of operation;
    operating the transceiver in the second mode of operation using the selected second passband frequency range;
    selecting a second processor clock frequency of the plurality of processor clock frequencies that produces no substantial spurious signals in the selected second passband frequency range;
    operating the processor at the selected second processor clock frequency; and
    maintaining operation of the processor with the selected second processor clock frequency during the operation of the transceiver in the second mode of operation and at the selected second passband frequency range.

2. The method of claim 1, wherein the analog mode is advanced mobile phone service (AMPS); and wherein the digital mode is code division multiple access mode (CDMA).

3. The method of claim 1, wherein the second mode is advanced mobile phone service (AMPS) with the selected second passband frequency range having a center frequency of approximately 900 megahertz (MHz); and
    wherein the first mode is the code division multiple access mode (CDMA) utilizing the first processor clock frequency at 19.2 megahertz (MHz) with a $46^{th}$ harmonic at 883.2 MHz.

4. The method of claim 3, wherein the step of selecting the second processor clock frequency further comprises the step of:
    increasing the first processor clock frequency from 19.2 MHz to 26.24 MHz.

5. A method for reducing effects of clock harmonics in a wireless communications device, the method comprising:
    selecting a first operation mode;
    generating a first transceiver carrier frequency for the passband of the first operation mode;
    generating a first clock frequency for operating at least one circuit of the wireless communications device as long as the first operation mode is selected, the first clock frequency having a plurality of first harmonic frequencies;
    selecting a second operation mode;
    generating a second transceiver carrier frequency for the passband of the second operation mode;
    changing the first clock frequency to a second clock frequency with a plurality of second harmonic frequencies so that none of the second harmonic frequencies are substantially equal to the second transceiver carrier frequency; and
    maintaining the second clock frequency for operating the at least one circuit as long as the passband uses the second transceiver carrier frequency.

6. The method of claim 5, wherein the first operation mode is one of a digital operation mode and an analog operation mode, and wherein the second operation mode is the other of the digital operation mode and the analog operation mode.

7. A method for reducing effects of clock harmonics in a plurality of communication passbands corresponding to a plurality of operation modes in a wireless communications device, the method comprising:
    generating a clock signal at a clock frequency for driving a processor circuit, the clock signal having a plurality of harmonics frequencies;
    generating a transceiver carrier signal in a transceiver for a first operation mode of the plurality of operation modes, the transceiver carrier signal at a carrier frequency for a first communication passband of the plurality of communication passbands for the first operation mode, wherein the carrier frequency is not substantially equal to any harmonic frequency of the plurality of harmonic frequencies;
    changing the carrier frequency to a second carrier frequency for a second communication passband for a second operation mode of the plurality of operation modes, wherein the second carrier frequency is substantially equal to a harmonic frequency of the plurality of harmonic frequencies;
    changing the clock frequency to a new clock frequency having a plurality of new harmonic frequencies, wherein the plurality of new harmonic frequencies are not substantially equal to the second carrier frequency; and maintaining the new clock frequency for driving the processor circuit as long as the second carrier frequency is utilized.

8. The method of claim 7, wherein the plurality of operation modes comprise:
   advanced mobile phone service (AMPS);
   personal communication services (PCS);
   global system for mobile communications (GSM);
   code division multiple access (CDMA); and
   wide-band code division multiple access (W-CDMA).

9. The method of claim 7, wherein the second operation mode is advanced mobile phone service (AMPS) with the second carrier frequency of approximately 900 megahertz, wherein the clock frequency is 19.2 megahertz having an interfering harmonic frequency of approximately 900 megahertz, and wherein the new clock frequency does not have the interfering harmonic frequency.

10. A system for reducing effects of spurious frequencies in a wireless communications device, the system comprising:
   a microprocessor having a reference frequency input, a clock selection output, and a command selection output, the microprocessor for selecting operation modes for operating the wireless communications device in one of a digital mode and an analog mode, and for outputting the selected operation mode on the command selection output;
   a clock having a clock output connected to the reference frequency input of the microprocessor, and an input connected to the clock selection output of the microprocessor, the clock outputting a first frequency clock corresponding to a first operation mode of the operation modes, the first frequency clock producing a first set of harmonic frequencies;
   a transceiver for transceiving a first communication passband of a plurality of selectable communication passbands corresponding to the first operation mode, the transceiver then transceiving a second communication passband of the plurality of selectable communication passbands in response to a second operation mode received at a transciever input connected to the command selection output of the microprocessor, the first set of harmonic frequencies interfering with the second communication passband;
   wherein the microprocessor selects a second frequency clock having a second set of harmonic frequencies that do not interfere with the second communication passband; and
   wherein the second frequency clock is maintained on the reference frequency input as long as the second communication passband is selected.

11. The system of claim 10, wherein the microprocessor is one of a programmable logic device and array.

12. The system of claim 10, wherein each selectable passband of the plurality of selectable communication passbands is associated with at least one operating mode of a plurality of operating modes comprising:
   advanced mobile phone service (AMPS),
   personal communication services (PCS),
   global system for mobile communications (GSM),
   code division multiple access (CDMA), and
   wire-band CDMA (W-CDMA).

13. The system of claim 10, wherein the second operation mode is AMPS having the second communication passband with a center frequency of approximately 900 megahertz, wherein the first frequency clock is 19.2 megahertz having an interfering harmonic frequency of the first set of harmonic frequencies of approximately 900 megahertz, and wherein the second frequency clock does not have the interfering harmonic frequency.

14. A method for reducing effects of spurious frequencies in a wireless communications device, the method comprising the steps of:
   operating a transceiver in a first mode of operation at a first passband frequency range of a plurality of selectable passband frequency ranges;
   operating a logic device at a first clock frequency of a plurality of clock frequencies;
   operating a transceiver in a second mode of operation at a second passband frequency range of a plurality of selectable passband frequency ranges such that the first clock frequency produces spurious frequencies in the second passband;
   selecting a second clock frequency of the plurality of clock frequencies that produces no substantial spurious frequencies in the second passband frequency range;
   operating the logic device at the selected second clock frequency; and
   maintaining operation of the logic device with the selected second clock frequency during the operation of the transceiver in the second mode of operation.

15. The method of claim 14 wherein the logic device is a programmable logic device.

16. The method of claim 14 wherein the logic device is a gate array.

17. A wireless communications device comprising:
   a transceiver operating in a CDMA mode having a first passband frequency range;
   a clock operating at a first clock frequency of at least two clock frequencies, the first clock frequency producing no spurious signals in the first passband frequency range;
   a processor operating at the first clock frequency, the processor comprising:
      mode selection means for selecting an AMPS mode having a second passband frequency range;
      processing means for determining a second clock frequency that produces no substantial spurious signals in the second passband frequency range, and;
      clock control means for adjusting the clock to the second clock frequency, the clock control means maintaining the clock at the second clock frequency as long as the transceiver continues to operate in the AMPS mode; and,
   an antenna connected to the transceiver.

18. A wireless communications device comprising:
   a transceiver utilizing a carrier frequency for sending and receiving electromagnetic signals in an analog mode of operation;
   a clock for generating a clock signal at a first frequency, the clock signal having a plurality of harmonics at a first plurality of harmonic frequencies;
   a processor comprising:
      carrier frequency control means for changing the carrier frequency to a second carrier frequency corresponding to a digital mode of operation, wherein the second carrier frequency is substantially equal to one harmonic frequency of the first plurality of harmonic frequencies; and clock control means for changing the first frequency to a second frequency having the plurality of harmonics at a second plurality of harmonic frequencies, wherein the second plurality of harmonic frequencies are not substantially equal to the second carrier frequency, the clock control means maintaining the second frequency until the carrier frequency control means changes the second carrier frequency to correspond to a new mode of operation; and an antenna coupled to the transceiver.

19. A communication device for reducing effects of clock harmonic frequencies in a plurality of passband frequency ranges corresponding to a plurality of operational modes, the communication device comprising:

a transceiver clock circuit for generating a first passband frequency and a second passband frequency of the plurality of passband frequencies, the first passband frequency corresponding to a first operational mode and the second passband frequency corresponding to a second operational mode of the plurality of operational modes;

a transceiver connected to the transceiver clock circuit and operating in the first passband frequency range;

a processor clock circuit for generating a first operating frequency of a plurality of operating frequencies, the processor clock circuit outputting the first operating frequency on a clock output; and a processor comprising:

a processor clock input connected to the clock output, the processor executing instruction sets utilizing any of the plurality of operating frequencies;

an operational mode selection output connected to the transceiver clock circuit for selecting the second operational mode of the plurality of operational modes;

a clock selection output connected to the processor clock circuit; and processing means for determining whether the first operating frequency produces interfering harmonic frequencies that interfere with the second passband frequency, for outputting a clock selection on the clock selection output for selecting a non-interfering operating frequency of the plurality of operating frequencies, for maintaining the selection of the non-interfering operating frequency on the clock selection output as long as the second operational mode remains selected.

20. The system of claim 19 wherein the second operational mode is AMPS having the second passband frequency of approximately 900 megahertz, wherein the first operational mode is CDMA having the first operating frequency of 19.2 megahertz with an interfering harmonic frequency of the interfering harmonic frequencies of approximately 900 megahertz, and wherein the non-interfering operating frequency does not have the interfering harmonic frequency.

* * * * *

UNITED STATES PATENT AND TRADEMARK OFFICE
CERTIFICATE OF CORRECTION

PATENT NO. : 6,999,723 B2
DATED : February 14, 2006
INVENTOR(S) : Kusbel et al.

It is certified that error appears in the above-identified patent and that said Letters Patent is hereby corrected as shown below:

<u>Column 5,</u>
Lines 44-46, change from "switching operation of the transceiver to a second mode of operation comprising the analog mode and the digital mode;" to
-- switching operation of the transceiver to a second mode of operation comprising the other of the analog mode and the digital mode; --.

Signed and Sealed this

Sixth Day of June, 2006

JON W. DUDAS
*Director of the United States Patent and Trademark Office*